United States Patent [19]

Lemelson

[11] 4,294,230
[45] Oct. 13, 1981

[54] SOLAR ENERGY COLLECTION PANEL AND METHOD

[76] Inventor: Jerome H. Lemelson, 85 Rector St., Metuchen, N.J. 08840

[21] Appl. No.: 51,869

[22] Filed: Jun. 25, 1979

[51] Int. Cl.³ .................................................. F24J 3/02
[52] U.S. Cl. ..................................... 126/438; 126/447
[58] Field of Search .............. 126/438, 439, 446, 447, 126/448, 449

[56] References Cited

U.S. PATENT DOCUMENTS

| | | | |
|---|---|---|---|
| 3,982,527 | 9/1976 | Cheng | 126/446 |
| 4,003,364 | 1/1977 | Ballius | 126/438 |
| 4,003,638 | 1/1977 | Winston | 126/439 |
| 4,088,121 | 5/1978 | Lapeyre | 126/438 |
| 4,090,495 | 5/1978 | Lesh | 126/438 |
| 4,162,824 | 7/1979 | Ma | 126/439 |
| 4,204,522 | 5/1980 | Wilson | 126/446 |

Primary Examiner—Herbert F. Ross

[57] ABSTRACT

A solar energy, concentrating and absorption panel is provided together with a method for converting solar energy to heat energy or electrical energy by the reflection and concentration of solar energy intersecting the panel. The panel is formed with a solar energy receiving portion thereof which is defined by a plurality of parallel channels extending horizontally across the panel, each of which contains at least two side wall portions which are highly reflective of light and which converge towards each other so that light entering such channels is reflected off the side wall portions thereof against the opposite side wall portions and continues to be directed toward the base of the channel, which base is coated with a light absorbing material such that the light directed thereagainst is concentrated and, as such, may be employed to heat either a fluid located in a passageway extending through the wall of the panel parallel and adjacent to the base of the channel.

11 Claims, 4 Drawing Figures

SOLAR ENERGY COLLECTION PANEL AND METHOD

SUMMARY OF THE INVENTION

This invention relates to heat transfer panels and methods for concentrating, absorbing and converting solar energy to either electrical energy or heat energy for use in heating systems associated with room and building heating and air conditioning and other functions requiring the transfer of solar energy or its conversion to electrical energy.

A substantial number of inventions and developments have been made in efforts to convert solar radiation to both usable heat energy and electrical energy. A variety of devices have been proposed which employ relatively complex assemblies and difficult to manufacture components for the purpose of concentrating or absorbing solar energy. These have varied from complex lens systems to relatively complex reflector systems. The instant invention relates to a light concentrating unit, preferably in the configuration of a sheet or panel which is formed of a lightweight metal such as aluminum, and which has either been roll formed or machined to a configuration providing a plurality of parallel, closely spaced channels in a surface thereof into which channels sunlight may be directed and reflected downwardly towards the bottom of the channel where it is concentrated and may be applied either to heat a heat transfer fluid located in a passageway adjacent the bottom of the channel or to a solar-to-electrical energy converter which is either located at the bottom of the channel or in heat transfer relationship therewith.

Accordingly, it is a primary object of this invention to provide a new and improved heat concentrating and absorption panel which is particularly useful in converting solar energy to either concentrated heat energy or electrical energy.

Another object is to provide a method of concentrating and absorbing solar energy which requires a relatively simple structure.

Another object is to provide a solar energy panel having a relatively high energy conversion efficiency.

Another object is to provide a solar energy panel capable of amplifying or concentrating solar energy, which is relatively inexpensive to produce.

Another object is to provide a solar energy panel for concentrating solar energy which is relatively simple in structure.

With the above and other such objects in view as may hereafter more fully appear, the invention consists of the novel constructions, combinations and arrangements of parts as will be more fully described and illustrated in the accompanying drawings but it is to be understood that changes, variations and modifications may be resorted to which fall within the scope of the invention as claimed without departing from the spirit and nature of the invention.

Figures 1, 2, 3:
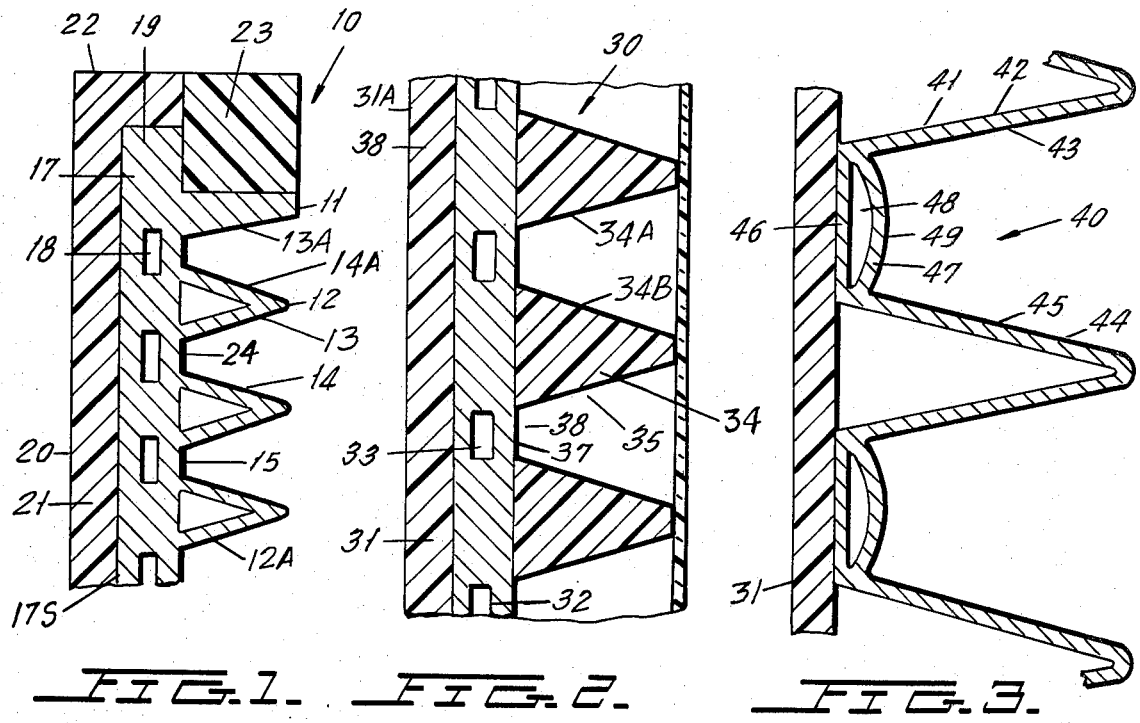
FIG. 1 is a sectioned side view of a fragment of a solar collection panel wherein a plurality of cavities with reflecting side walls extend across the panel for collecting and concentrating solar energy against absorbing surface areas of the panel.
FIG. 2 is a sectioned side view of a fragment of a solar collection and concentrating panel showing a modified structure over that of FIG. 1.
Figure 4:
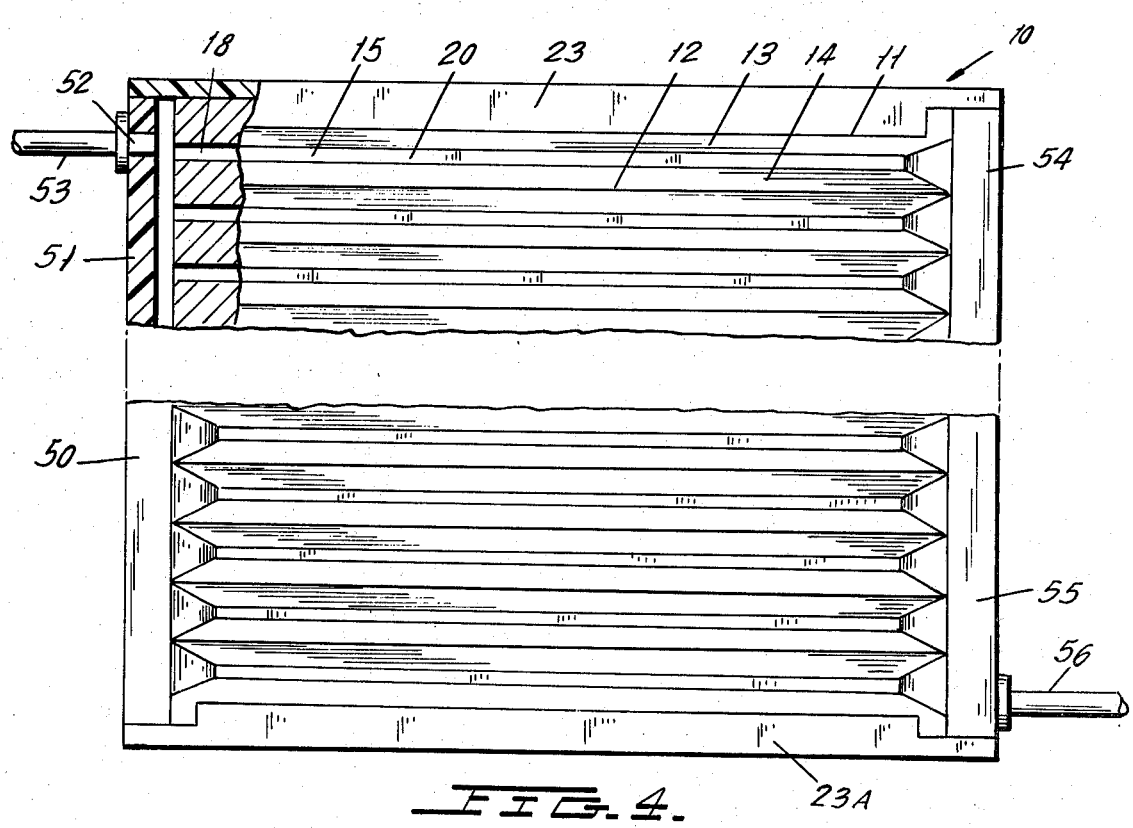

FIG. 3 is a sectioned side view of yet another structure in a reflecting cavity solar collection and concentrating panel employing an extruded sheet or inflated metal sheet to provide reflecting walls of cavities for collecting and concentrating solar energy at the bottoms of such cavities, and FIG. 4 is a plan or front view of an assembled solar panel of the types shown in FIGS. 1 and 2 with parts broken away and sectioned for clarity.

In FIG. 1 is shown a first form of the invention comprises a solar energy collector panel 10 formed of a plurality of components including a support 20 in the form of an open box-like container having a base or back wall 21 and a circumscribing side wall 22. Container 20 is shown molded of plastic resin such as structural cellular plastic, for supporting and insulating a metal panel 11 which serves to collect and concentrate solar energy by reflection and absorption of such energy. If the support 20 is made of sheet metal, an insulating cellular plastic layer or air space may be disposed between the back wall of such support and the rear surface 17S of the base 17 of the panel 11 to reduce heat loss thereacross.

The metal panel 11 has its front face formed with a plurality of parallely extending wedge-like protrusions 12 having converging side walls 13 and 14 tapering towards each other and defining a plurality of parallel elongated cavities into which solar energy may be directed and may be concentrated by being reflected off the reflecting surfaces 13A and 14A of the side walls 13 and 14 of each tapered cavity. Each of the elongated cavities formed by the tapered walls 13 and 14 has a flat, elongated strip-like base 15 which is narrower in width than the width of the space between the outer portions of adjacent wedge-like formations 12, thereby providing strip-like areas against which solar energy may be concentrated which solar energy is greater per unit area than the amount of solar energy intersecting a flat surface of the same area.

The solar energy absorbing panel 11 preferably has the surfaces of the tapered side wall portions 13A and 14A fabricated in a highly reflective condition to properly reflect light entering the elongated cavities therebetween while the surfaces 15 at the base of the elongated cavities are preferably coated with a light absorbing material 25, such as a plastic or ceramic coating containing carbon black or other suitable absorbing particles. If the panel 11 is extrusion formed or cast of aluminum, the surfaces 13A and 14A may be anodized or coated with a suitable protective coating material, such as a plastic resin. While the light absorbing material disposed on surfaces 15 at the bases of the elongated cavities are void of such protective coating material applied to surfaces 13A and 14A.

Aligned with and disposed immediately beneath each of the surfaces 15 is a passageway 18 cast or extrusion formed in the sheet 11 and preferably extending from one end or side of the sheet to the other so that all of such passageways, which may be formed during the extrusion or casting of the sheet, may be interconnected at their ends by means of headers or suitable interconnecting passageways to permit the flow of a heat transfer fluid through those portions of the metal panel 11 which are directly aligned with the absorbing portions 20 thereof so that the concentrated solar energy directed against the bottoms of the tapered cavities or channels may be absorbed and transmitted by conduction through respective portions of the panel to the fluid of the passageways 18.

The wedge-like formations 12 are each shown formed with hollow cavities or passageways 12A extending completely therethrough which may serve to both lighten the panel, reduce the amount of material thereof and to insulate the front side of the panel to minimize the amount of heat lost by conduction through the panel. In order to further reduce heat loss, a sheet of transparent glass or plastic may be disposed completely across the front face of the panel 11 and fastened to such panel or to opposed border strip portions 23 and 23A which are shown secured against the border portions 19 of the panel 11 and the edges of the side walls 22 of the base 20. It is also noted that the panel 11 may be formed of two or more extrusions of metal or one or more extrusions and roll formed sheet metal which are bonded or welded together to provide the configuration illustrated or a modification thereof. It is noted that the total thickness of the panel 10 of FIG. 1 may vary in the range of 1/16" to ¼".

In FIG. 2 is shown a modified form of solar energy absorbing panel 30 of the type illustrated in FIG. 1. A support, such as a box-like container 31 has a rear wall portion 31A supporting the rear face of a flat sheet or panel 32 made of metal, such as aluminum, and containing a plurality of parallel passageways 33 formed therein and extending completely through sheet 32 from one thereof to the other end. Cast or molded against the front face of the passageway or duct containing sheet 32 or forming part of a larger molding disposed thereagainst, are a plurality of parallel, wedge-like formations 34 defining parallel cavities 35 extending substantially across the assembly 30 for receiving, collecting and reflecting solar energy towards the bases of said cavities defined by respective narrow strip-like portions 37 of the metal sheet 32 and preferably coated with a solar energy absorbing material such as one containing particles of carbon and denoted 38.

The side surfaces 34A and 34B of the formations 34 may be rendered highly reflective to the light entering the cavity by coating such surfaces with a metal, such as aluminum which is plated, sputtered or metallized directly thereon or which may be defined by fine particles of metal disposed within a clear plastic material spray coated thereon. Such surfaces may also be defined by metal foil or sheet metal which is bonded thereagainst.

The passageways 33 are preferably interconnected by respective headers at the side edges of the panel constructed, for example, as illustrated in FIG. 4.

In FIG. 3, a portion of a solar energy collection panel 40 is shown defined by a flat base 41, such as the bottom of a box-like frame or container for the panel, which may be molded of plastic such as structural cellular plastic, the front face of which supports portions of a roll formed or extruded duct containing sheet 41 which is formed with a plurality of pairs of parallely extending, outwardly tapered sheet formations 42 and 44, the inside surfaces 43 and 45 of which reflect solar energy entering the respective parallel cavities or channels defined by such sheet formations so that the solar energy is concentrated at the bottoms of such channels. The bottom portions of these channels define respective parallel passageways 48 each formed of an arcuate outer wall portion 47 and a flat inner wall portion 46 which abuts the front face of the base 31. The outer surface of the outer wall portion 47 is preferably coated with a solar energy absorbing material 49 such as the described carbon black particle containing coating material. The surfaces 43 and 45 are preferably highly reflective of light and are either anodized or coated with a protective coating material.

It is noted that variations in the configurations and constructions of the several embodiments of the invention illustrated in FIGS. 1-3 may be possible in order to provide a plurality of parallel, inwardly tapering surfaces and volumes into which solar energy may be directed and collected at the base portions thereof. For example, the irregularly formed sheet 41 of FIG. 3 may be provided without the duct formations therein and may be disposed in engagement with a ducted sheet of the type illustrated in FIG. 2. In FIG. 4, a typical panel assembly 10 is shown formed of a duct containing extrusion 11 of the type shown in FIG. 1 and having secured to the ends thereof respective channel shaped headers 50 and 54, the side walls 51 and 55 of which are spaced from the side ends of the channel defining collectors 11 so as to provide internal volumes which interconnect the passageways 18. An opening 52 is provided in wall 51, into which opening the fitting of a tube or pipe 53 extends securing such tube to the header so that heat transfer fluid passed through the tube will enter the passageway system of the panel 10 and may pass therefrom through the various passageways 18. A similar opening is provided in the side wall of the header 55 for connecting an exit tube or duct 56 to the panel for the flow of heat transfer fluid from the panel. Notations 23 and 23A refer to respective capping channels which are sealingly secured to the upper and lower edges of the panel assembly to form closures with the header volumes and the passageways.

It is noted that the solar energy absorbing panels illustrated and described above may be employed to heat water passed directly through the panels or to boil a suitable liquid, such as a liquid component of a heat pipe system, to transfer heat to a heat transfer means located outside of the panel for heating a liquid, such as water, disposed thereagainst or for heating a solar cell for generating electricity. A plurality of such solar cells may also be disposed directly within the heat receiving panels or against the surfaces of the base-like strip portions of the panels formed therein, thereby eliminating the need for sheets or panels containing the parallel passageways illustrated and described in the drawings. Such panel may be composed of a single sheet or extrusion having the tapered side wall formations illustrated and supported by a second sheet or box-like frame. A combination of photo-electric cells supported against the base portions of the tapered cavities and the illustrated passageways may also be provided to both utilize the solar energy to generate electricity and to heat the heat transfer fluid. Such solar energy cells may be electrically connected to a battery by forming strips of current conducting metal directly against the surfaces of the cells which may be deposition formed or otherwise provided against the bases of the channels and/or by providing such strips insulatedly supported along the tapered side walls of the wedge-like formations, preferably near the bottoms of the channels and connected at their ends to an electrical energy distribution system which may include pluggable coupling or connection means for connecting wires to a battery located adjacent to or remote from the panel or perhaps forming part of the panel such as in extended portions of the header volumes V at the side ends of the panel.

In order to enhance the so-called greenhouse effect wherein heat energy is retained within the volumes defined by the tapered channels or cavities of the described panel assemblies, the clear plastic or glass capping sheet material which extends across the front face of the panel and encloses such volumes, may have its inside surface coated with a thin film of metal, such as gold having a thickness of several angstroms to several millionths of an inch.

It is noted that the panels shown in FIGS. 1 and 3 may also contain a thin transparent sheet of plastic or glass extending across and sealed to the front face of the panel, as in FIG. 2, to provide the "greenhouse effect" with respect to solar energy existing as heat within the enclosed volume defined in part by such sheet. For further details of the geometry of the wedge shaped ribs 12 and 34 reference is made to U.S. Pat. No. 3,229,682.

It is also noted that the fluid contained within the passageways 18,33 and 48 may comprise low boiling point liquid such as amonia, fluorocarbon such as Freon, sulfur dioxide or other material such as a heat storage material such as a metal hydride. If such a low boiling point liquid is employed, the passageways may form part of a closed system defining a so called heat pipe connected to a remote heat transfer device coupled to heat a liquid or perform any desired function.

In the proposed embodiment of the invention which utilizes the panels described as components of a closed circuit "heat pipe" system, a black dye such as nigrosene or Acidol or such fluid additives as described in such U.S. Pat. Nos. as 3,107,052; 3,939,819 and 4,134,389. In such embodiment, a plurality of such panels may be connected in series or parallel with the passageways thereof defining a closed circuit or a plurality of such closed circuits including insulated flexible or rigid conduits extending to one or more heat transfer devices operable to transfer the heat collected and transmitted by the vaporized or partially vaporized heat transfer fluid to another heat transfer fluid such as water, to a heat storage unit, to a heat pump system or to a chemical of a chemical processing system for heating and causing reactions with respect to one or more chemicals thereof. The black dye may be dissolved, for example, in such low boiling point fluids as Freon (fluorocarbons), amonia, metal hydrides or the like which may be partially or complete vaporized when focused solar energy is directed as described thereagainst wherein such dye also vaporizes along with the fluid in which it is dissolved or is deposited within the panel in such a manner that it easily dissolves again in the fluid when the latter condenses. In such a closed circuit heat-pipe type system, a valve may be employed to control flow and liquid evaporation, which valve may be manually or automatically adjusted in accordance with system needs. The closed heat-pipe system may also be sealed at such a vapor pressure that only part of the liquid will evaporate when subjected to the focused solar energy, thereby retaining the dye in liquid solution at all times, and eliminating the possibility of the dye clogging any of the passageways.

I claim:

1. A solar energy unit comprising an integral unitary metal panel structure having a front face adapted to receive solar energy, said unitary panel structure containing a plurality of closely spaced parallel cavities formed therein and extending inwardly of said front face of said panel structure, said cavities having side wall portions which converge inwardly toward each other, each of said cavities having a bottom wall portion joining said side wall portions together, said side wall portions of said cavities of said unitary panel structure being highly reflective of sunlight directed against the face of said panel structure containing said cavities and being angled to reflect such sunlight between said converging wall portions toward the bottom of each cavity, the bottom wall portion of each of said cavities having a sunlight absorbing material to permit sunlight which is directed into the cavities and reflected off the side wall portions of the cavities to be absorbed by said bottom wall portions, whereby concentrated heat of the absorbed sunlight will be conducted from the locations where the energy is absorbed through bottom portions of the panel structure, a plurality of parallel fluid conduits underlying said bottom portions and coextensive with said cavities and formed integral within and extending through said unitary panel structure and containing heat transfer fluid in closely spaced heat transfer relationship with respective bottom portions of said panel structure which are directly aligned with said cavities therein, said conduits containing heat transfer fluid adapted to receive heat transferred thereto through said bottom wall portions of said cavities of said panel structure and being aligned with respective of said cavities.

2. A solar energy absorption panel in accordance with claim 1 wherein said plurality of fluid conduits are extrusion formed within said sheet-like structure and that portion of the sheet-like structure which underlies said cavities.

3. A solar energy panel in accordance with claim 2 including means for interconnecting the ends of said conduits defining respective passageways formed in said panel structure.

4. A solar energy panel in accordance with claim 1 in which said cavities formed in said panel structure are elongated channels extending parallel to each other across most of said panel structure and said fluid conduits extend through said panel structure parallel to said elongated parallel cavities formed in sheet-like structure so as to permit the heat transfer fluid thereof to receive solar energy directly from said heat absorbing portions of said panel.

5. A heat transfer panel in accordance with claim 4 wherein said elongated parallel channels formed in said panel structure contain flat side wall portions which converge toward each other and wherein said sunlight absorbing material is coated directly against the surfaces of the bottom wall portions of said panel structure.

6. A heat transfer panel in accordance with claim 5 in which said elongated parallel channels formed in said panel structure contain flat side wall portions which converge toward each other and said solar energy absorbing material is coated directly against the bottom wall portion of said panel.

7. A solar energy panel in accordance with claim 6 wherein said panel structure is fabricated of aluminum and the side wall portions of said elongated cavites formed in said panel structure are anodized to protect the reflecting surfaces thereof.

8. A solar energy panel in accordance with claim 6 wherein said panel structure is formed of aluminum and the reflecting side wall portions thereof are coated with a light transmitting protective coating, the bottom wall of said panel containing said solar energy absorbing material being void of said protective coating.

9. A solar energy panel in accordance with claim 1 which has a total thickness in the range of 1/16" to ¼".

10. A heat transfer panel in accordance with claim 1 including a frame attached to and supporting said panel structure.

11. A solar energy panel in accordance with claim 1 wherein said cavities have flat sidewalls and formed within said panel structure are elongated cavities which extend parallel to each other with each of said elongated cavities containing an elongated bottom wall portion, there being at least one of said fluid conduits formed in said panels structure in direct alignment with the bottom wall portion of each of said cavities formed in said panels structure to receive the solar energy which is reflected off the side walls of the cavities and absorbed by the absorbing material along the bottom wall portions of the cavities and transferred directly to said conduits aligned with said bottom wall portions of said cavities.

* * * * *